H. C. LANGLOIS.
HORSE DETACHER.
APPLICATION FILED JULY 27, 1909.

982,144.

Patented Jan. 17, 1911.

Witnesses
S. P. Buck.

Inventor
Henry C. Langlois.
By Victor J. Evans
Attorney

THE NORRIS PETERS CO., WASHINGTON, D. C.

UNITED STATES PATENT OFFICE.

HENRY C. LANGLOIS, OF THUNDER BUTTE, SOUTH DAKOTA.

HORSE-DETACHER.

982,144.           Specification of Letters Patent.      Patented Jan. 17, 1911.

Application filed July 27, 1909. Serial No. 509,841.

*To all whom it may concern:*

Be it known that I, HENRY C. LANGLOIS, a citizen of the United States of America, residing at Thunder Butte, in the county of Schnasse and State of South Dakota, have invented new and useful Improvements in Horse-Detachers, of which the following is a specification.

This invention relates to horse detachers designed for the purpose of disconnecting the thills or the pole from a vehicle axle in case the animals connected to the vehicle become unruly and are about to run away, and one of the principal objects of the invention is to provide simple, efficient and reliable mechanism for quickly disconnecting the animals from the vehicle.

Another object of the invention is to provide means for connecting the thills or tongue to the vehicle axle, said means comprising a pair of clips having hinged members and means for holding said hinged members closed and a lever designed for the purpose of releasing the hinged members to permit the thills or tongues to be disconnected from the axle.

Still another object of the invention is to provide a horse detacher which will permit the horse or horses to carry the tongue or thills and the harness away from the vehicle in case said animals become unruly or are about to bolt and run away.

These and other objects may be attained by means of the construction illustrated in the accompanying drawing, in which,—

Figure 1:
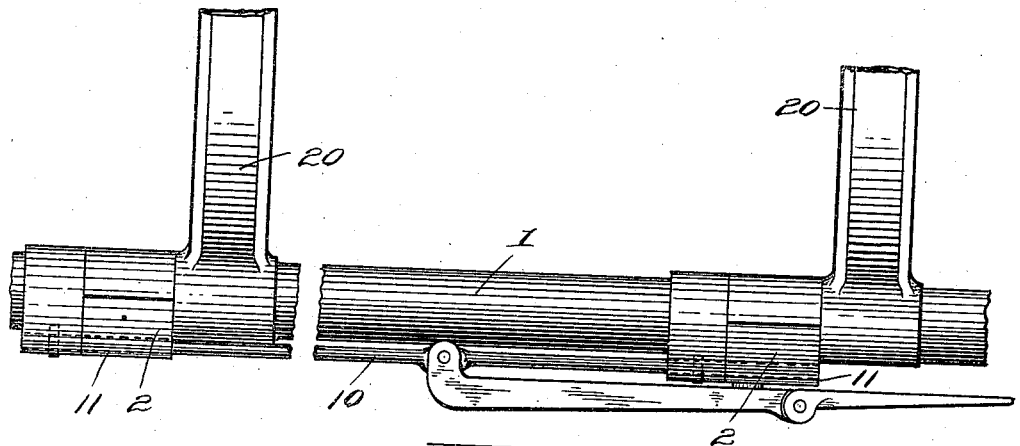
Figure 2:
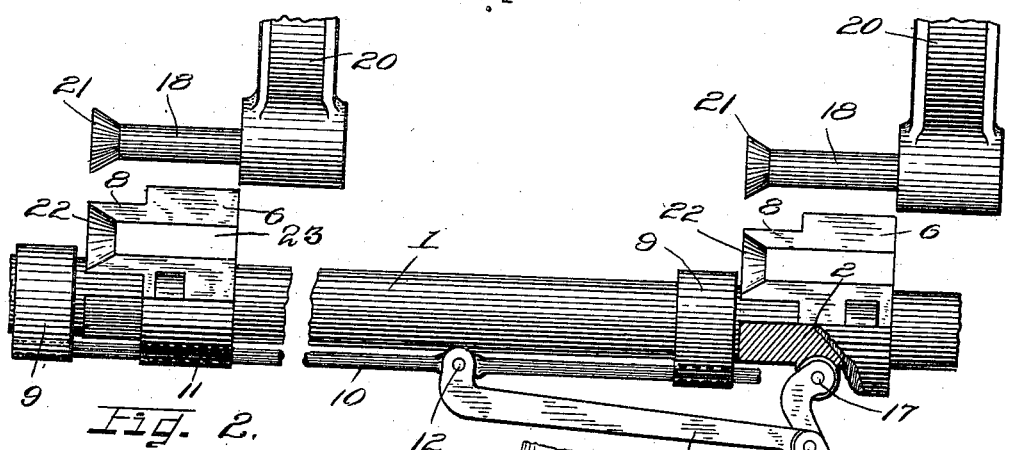
Figure 3:
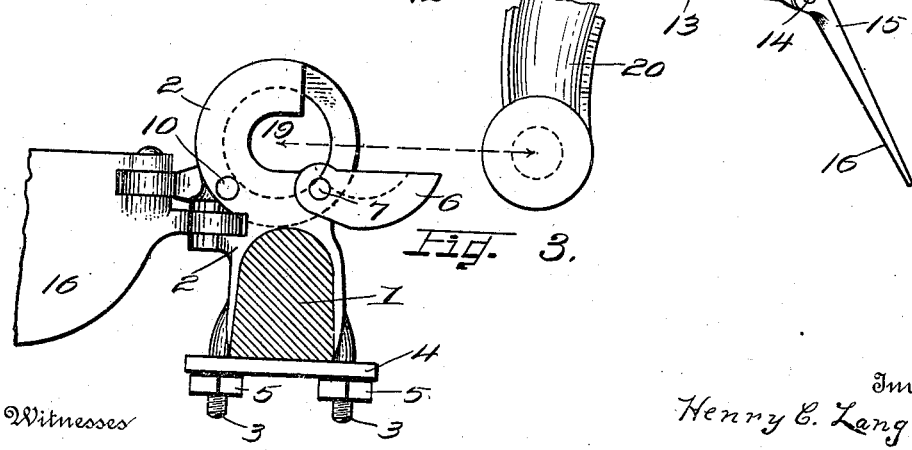

Figure 1 is a plan view of a horse detacher made in accordance with my invention, a portion of the axle being broken away. Fig. 2 is a similar view, showing the thills disconnected from the axle and a portion of the device being shown in section. Fig. 3 is a vertical sectional view through the axle and showing the thills disconnected from the clips.

Referring to the drawing, the numeral 1 designates an axle which may be of the usual or any suitable form. Connected to the axle 1 near the opposite ends thereof are the clips 2, said clips being provided with reduced threaded ends 3 by means of which the clips are secured to the axle. A washer plate 4 is disposed underneath the axle, and threaded nuts 5 are secured to the threaded portions 3. The clips 2 are each provided with a hinged member 6, said member being connected to the clip 2 by means of a pintle 7. At one end the clip 2 and the hinged member 6 are reduced in diameter, as at 8 and having therein the flared ends 22 of the recesses 23. Sliding rings 9 are connected to a rod 10, said rod being supported in tubular portions 11 of the clips 2. Pivotally connected at 12 to the rod 10 at a point nearly central thereto is a lever 13, and connected to said lever 13 by means of a pin 14 is a foot lever 15 having an enlarged outer end 16. The foot lever 15 is pivotally connected, as at 17, to one of the clips 2. The rings 9 fit the reduced portions 8 of the clips, and when said rings are thrown to the right in Fig. 1, the hinged portions 6 are prevented from movement and serve to hold the projecting bolts 18 in the opening 19 through the clips. The thill irons 20 or the hounds of a pole or tongue are provided with the bolts 18 extending each from one side thereof. said bolts having heads 21 adapted to fit the flared portions 22 of the recesses 23 in the clips.

The operation of my invention may be briefly described as follows: When the clips are closed around the bolts 18, as shown in Fig. 1, the shafts are secured to the vehicle axle. Should the horse become unruly and show a disposition to run away, the driver places his foot upon the lever 16 and draws it backward to the position shown in Fig. 2, which will permit the bolts 18 to be released from the clips 2, the horse carrying the shafts and harness and the vehicle being left behind.

From the foregoing it will be obvious that a horse detacher made in accordance with my invention is comparatively simple in construction, is quick in operation, can be readily connected to the vehicle axle or detached therefrom and can be manufactured at comparatively low cost.

The device as a whole can be attached to any axle without material alteration.

I claim:—

1. A horse detacher comprising an axle, clips secured to said axle, said clips each being provided with a hinged member, bolts connected to the thills, said bolts adapted to engage said clips, rings for engaging said clips and holding the hinged members closed, a rod connecting said rings, and a foot lever for moving said rod and rings to connect and disconnect the hinged members.

2. A horse detacher comprising a vehicle axle, clips connected to said axle, said clips each being provided with a hinged member and a reduced portion, rings for surrounding the reduced portion of said clips, a connecting rod to which said rings are attached, a lever pivoted to said rod, a foot lever pivoted to said first mentioned lever, said foot lever being pivoted to one of the clips, and thills provided with laterally extending bolts to engage said clips.

3. A horse detacher comprising clips connected to a vehicle axle and provided with hinged members having recesses formed therein and flaring at one end, said hinged members being also provided with reduced portions, the reduced portion having formed therein the flaring ends of the said recesses, sliding rings for engaging said reduced portions, headed bolts on the thills adapted to be seated in said recesses, and means for sliding said rings to close and release said hinged members for connecting and disconnecting the thills.

4. A horse detacher comprising a pair of clips secured to the vehicle axle, hinged members on said clips, said hinged members being formed with a bolt opening, a counter-sunk portion also formed in said hinged members, headed bolts on the thills or pole of a vehicle adapted to be seated in said bolt openings, the heads of said bolts engaging said counter-sunk portions, sliding rings for opening and closing said hinged members, and means connected to said sliding rings and one of said hinged members for engaging and disengaging said rings with said hinged members.

In testimony whereof I affix my signature in presence of two witnesses.

HENRY C. LANGLOIS.

Witnesses:
J. W. HARRELL,
C. E. TAYLOR.